(12) United States Patent
Matui

(10) Patent No.: US 6,438,118 B1
(45) Date of Patent: Aug. 20, 2002

(54) CODE-MULTIPLEXING COMMUNICATION APPARATUS

(75) Inventor: Hitosi Matui, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/102,575

(22) Filed: Jun. 23, 1998

(30) Foreign Application Priority Data

Jun. 25, 1997 (JP) ............................................. 9-168348

(51) Int. Cl.[7] .............................................. H04B 7/216
(52) U.S. Cl. ...................................... 370/335; 375/142
(58) Field of Search ................................ 370/335, 342; 372/142, 143, 150, 152

(56) References Cited

U.S. PATENT DOCUMENTS 5,461,610 A * 10/1995 Weerackody ................ 370/342

FOREIGN PATENT DOCUMENTS

| JP | 8-163087 | 6/1996 |
| JP | 9-18451 | 1/1997 |
| JP | 9-102758 | 4/1997 |

* cited by examiner

Primary Examiner—Chau Nguyen
Assistant Examiner—D. Trinh
(74) Attorney, Agent, or Firm—Whitman, Curtis & Christofferson, P.C.

(57) ABSTRACT

A code-multiplexing communication apparatus includes a splitting unit for splitting incoming serial transmitted data into N (N is integer equal to or greater than 2) number of signal trains; N number of spread unit for performing spreading for each of the N number of signal sequences with use of a spread code; an adding unit adding the N number of signal sequences with the spreading processed by the N number of spread unit, for outputting a code-multiplexed signal; and a modulating unit for modulating the code-multiplexed signal, comprising, filter unit having an inverse characteristic to a frequency characteristic of an autocorrelated distortion caused by the spreading, removing a transmission path distortion.

10 Claims, 9 Drawing Sheets

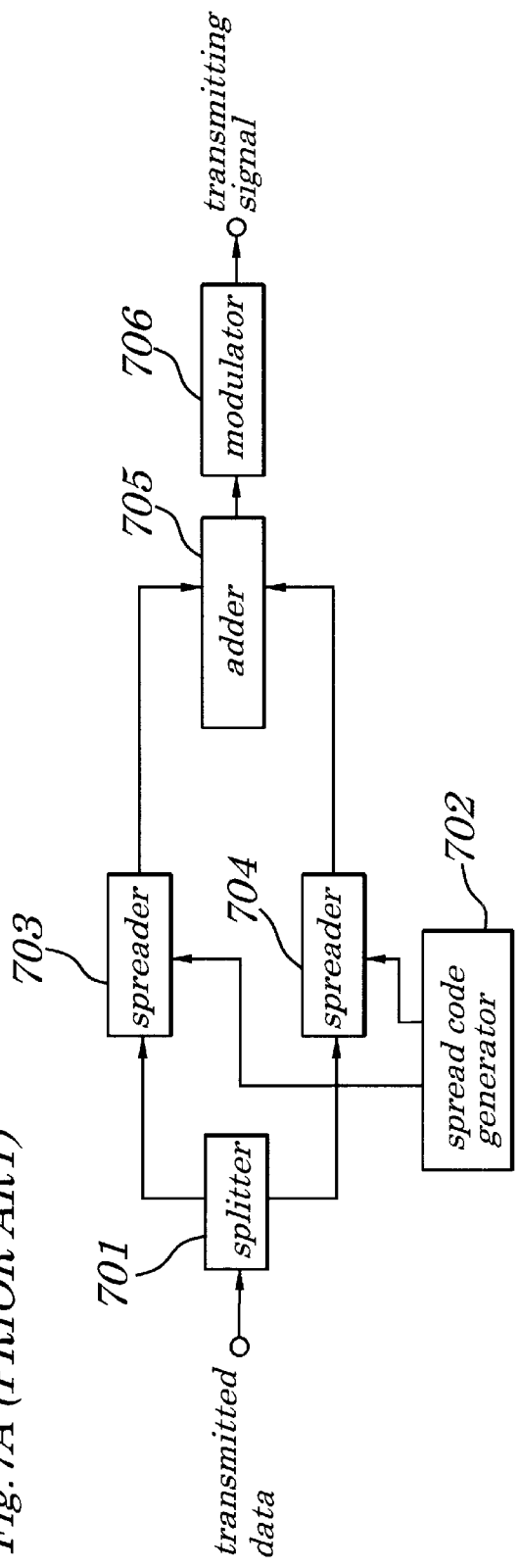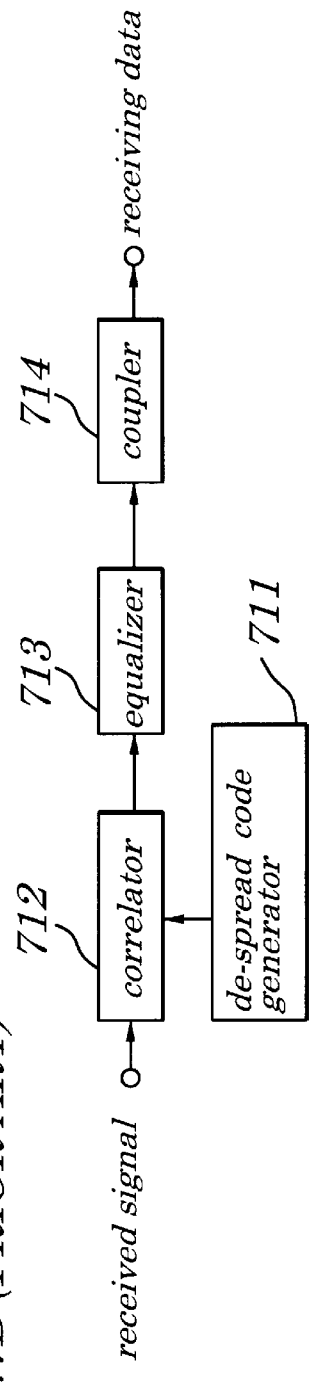
Fig. 7A (PRIOR ART)
Fig. 7B (PRIOR ART)

CODE-MULTIPLEXING COMMUNICATION APPARATUS

BACKGROUND OF THE INVENTION

1. Field of the Invention

The present invention relates to a code-multiplexing communication apparatus capable of removing an autocorrelated distortion with use of a simple circuit structure.

2. Description of the Related Art

There has proposed a code-multiplexing communication apparatus for realizing a large scale communication with transmission of multiplexing spread spectrum code.

In such code-multiplexing communicating apparatus, FIG. 7A shows a transmission unit of the communication apparatus, while FIG. 7B shows a reception unit thereof, noting that the number of code multiplex is 2 (or N=2) in this case.

Referring to FIG. 7A, the transmission unit has: a splitter 701 for splitting incoming transmitted data into two data signals; a spread code generator 702 for generating a spread code; spreaders 703 and 704 for carrying out a spreading for data signals split by the splitter 702; an adder 705 for adding signals from the spreaders 703 and 704; and modulator 706 for modulating signal from the adder 705 to output a transmitting signal.

Referring also to FIG. 7B, the reception unit has a de-spread code generator 711 for generating a spread code used for a de-spreading; a correlator 712 for carrying out a correlated calculation of an incoming received signal and the spread code; an equalizer 713 for equalizing an output signal from the correlator 712; and a coupler 714 for reproducing receiving data from an output signal of the equalizer 713.

With the constitution described above, the transmitted data is inputted to the splitter 701 that splits the data into two data signals. As a result, a half symbol rate of the transmitted data is inputted to each of the spreaders 703 and 704.

In addition, the spread code generator 702 generates a code used for the spreading in which such code is of the 11-bit Barker code, for example. The code supplied to the spreaders 703 and 704 also have a phase displacement corresponding to a displacement between two chips or two integrated circuits.

The spreaders 703 and 704 perform the spreading for the data signals split by the splitter 701 with use of the spread code supplied from the spread code generator 702. The adder 705 adds both the spread spectrum signals generated in the spreaders 703 and 704 to output a multiplexed signal.

The modulator 706 converts the multiplexed signal from the adder 705 into a radio wave to be able to transmit a transmitting signal as wireless.

In the case of reception unit as shown in FIG. 7B, the de-spreading code generator 711 generates a spread code used for a de-spreading and supplies it to the correlator 712.

The correlator 712 carries out a correlated calculation of an incoming received signal and the spread code from the de-spread code generator 711 to perform the de-spreading. A code-multiplexed signal is split into two signals that correspond to the two chips.

In the case of practical data transmission, a multi-path distortion is contained in the received signal on the transmission. Assuming that one of two codes to be multiplexed has a waveform caused by a multi-path distortion as shown in FIG. 8A (one pulse is expanded) and the other code to be multiplexed also has a waveform caused by the multi-path distortion as shown in FIG. 8B, for example, the waveforms of those codes being multiplexed interfere in each other, therefore, the waveform becomes a state as shown in FIG. 8C. Thus, the two codes may not be split under this state without arising error. To this end, the equalizer 713 removes such multi-path distortion and outputs a waveform as shown in FIG. 8D.

The equalizer 713 may be used a decision feedback equalizer shown in FIG. 9. In the case where a signal shown in FIG. 8A is supplied to the equalizer shown in FIG. 9, a decider 901 receives a first data "1.0" through an adder 903 to output data "+1" which is supplied to a delay element 902. Subsequently, data "0.7" is inputted to the adder 903, but the data "0.7" is inputted to the adder 903 from a multiplier 904 received data "+1" from the delay element 902, therefore, the output of adder 903 becomes "0". Because of this, the decider 901 outputs "0" to the delay element 902. At the subsequent timing, data "0.3" is inputted to the adder 903. At this time, the output of adder 903 becomes "0" since data "−0.3" is inputted to the adder 903 from a multiplier 906 which receives data "+1" from a delay element 905. That is, the output of multiplier 904 is "0" since the output of delay element 902 is "0". As a result, the decider 901 outputs "0". As described above, the equalizer 713 outputs a signal from which a multi-path distortion is removed. In the case where the multiplexed signal shown in FIG. 8C is inputted to the equalizer 713, the multi-path distortion is also removed, obtaining the output signal shown in FIG. 8D. It is noted that the coefficient of multiplication for the multipliers 904 and 906 may be determined by transmitting a preamble signal having predetermined information prior to the data transmission.

Accordingly, the signal being removed the multi-path distortion is supplied to the coupler 714 which converts the received signal into a signal form similar to the transmitted data to thereby output received data.

Japanese patent laid-open gazette 9-102758 discloses such code-multiplexing communication apparatus similar to that described above.

For the purpose of manufacturing more reliable apparatus, there would be some significant points, as follows. The code-multiplexing communication apparatus should be considered an autocorrelated distortion, that is, in the case of increasing the multi-path distortion, removal of the distortion may not be sufficiently carried out by the equalizer due to the affection of autocorrelated distortion.

For example, in the case of performing the correlated calculation with use of the 11-bit Barker code, an autocorrelated distortion represents a waveform as shown in FIG. 10A. That is, when coinciding the phase of waveforms, a value becomes "+1", however, when displacing these phases, the value does not sufficiently become "0", causing a distortion alternately indicated values "0" and "−1/11" as distortion value. Assuming that a multi-path distortion is present in the transmission path as shown in FIG. 10B, not only an amplitude where the phase is matched changes, but also a distortion where the phase is displaced changes increasingly, with reference to the output of correlator 712 shown in FIG. 10C.

Under such condition of the large multi-path distortion, as the code multiplex is performed, the self-correlated distortion is accumulated, causing deterioration of the signal deciding performance.

It is possible to remove the autocorrelated distortion with use of the equalizer, however, in order of removing the distortion expanded to 21 chips, the constitution of equalizer becomes enormous size so that the tap coefficient of equalizer is required to make longer.

SUMMARY OF THE INVENTION

It is therefore an object of the present invention to provide a code-multiplexing communication apparatus capable of removing an autocorrelated distortion with use of a simple circuit structure, preventing transmitting signal from reducing a signal deciding performance, increasing the number of code multiplex and enhancing transmission efficiency.

According to a first aspect of the present invention, there is provided a code-multiplexing communication apparatus including: a splitting unit for splitting incoming serial transmitted data into N number of signal sequences; N number of spread units for performing out a spreading for each of the N number of signal sequences with use of a spread code; an adding unit adding the N number of signal sequences with the spreading processed by the N number of spread units to output code-multiplexed signal; and a modulating unit for modulating the code-multiplexed signal, in which a filter unit is also provided that it has an inverse characteristic to a frequency characteristic of an autocorrelated distortion caused by the spreading.

The filter unit may be provided on succeeding stages of either the N number of spread units or the adding unit.

The filter unit may include a transversal type filter having a plurality of delay elements, a plurality of multipliers, and a plurality of adders. It may also be a filter having the plurality of delay elements and a read-only memory.

According to a second aspect of the present invention, there is provided a code-multiplexing communication apparatus including that incoming serial transmitted data is split into N number of signal sequences, a spread spectrum is performed for each of the signal sequences with use of a spread code, the N number of signal sequences with the spreading processed is then added each other, and a code-multiplexed signal modulated and transmitted is received, in which the code-multiplexing communication apparatus also includes a correlating unit for performing a de-spreading for incoming a received signal, and a filter unit is provided on a preceding stage of the correlating unit, the filter unit having an inverse characteristic to a frequency characteristic of an autocorrelated distortion caused by the spreading.

The filter unit may also include either a transversal type filter having a plurality of multipliers and a plurality of adders or a filter having a plurality of delay elements and a read-only memory.

According to a third aspect of the present invention, there is provided a code-multiplexing communication apparatus for transmitting code-multiplexed data with use of a spread spectrum, comprising: a spread code generator generating a spread code for performing the spreading, for outputting phase displaced signals each split into number of N; a splitter converting incoming serial transmitted data into N number of signal sequences, for transmitting the signal trains in parallel; N number of spreaders for performing the spreading for the N number of signal sequences with use of the spread code; N number of filters for filtering output signals from the N number of spreaders with use of an inverse characteristic to a frequency characteristic of an autocorrelated distortion caused by the spreading; an adder for adding outputs of the N number of filters; a transmitter having a modulator for modulating an output signal from the adder to output a transmitting signal; a de-spread code generator for generating a spread code for a de-spreading and outputting the spread code; a correlator performing a correlated calculation of an incoming received signal and the spread code to perform the de-spreading; an equalizer for removing a transmission path distortion from output signal of the correlator; and a receiver having a coupler for assembling receiving data by performing an inverse operation for an output signal from the equalizer to an operation performed by the splitter.

According to a forth aspect of the present invention, there is provided a code-multiplexing communication apparatus for transmitting code-multiplexed data with use of a spread spectrum, comprising: a spread code generator generating a spread code for performing the spreading, for outputting phase displaced signals each split into number of N; a splitter converting incoming serial transmitted data inputted into N number of signal sequences, for transmitting the signal sequences in parallel; N number of spreaders for performing the spreading for the N number of signal sequences with use of the spread code; an adder for adding outputs of the N number of spreaders; a transmitter having a modulator for modulating an output signal from the adder to output a transmitting signal; a filter for filtering an incoming received signal with use of an inverse characteristic to a frequency characteristic of an autocorrelated distortion caused by the spreading; a de-spread code generator for generating a spread code for a de-spreading and outputting the spread code; a correlator performing a correlated calculation of an output signal from the filter and the spread code to perform the de-spreading; an equalizer for removing a transmission path distortion from output signal of the correlator; and a receiver having a coupler for assembling receiving data by performing an inverse operation for an output signal from the equalizer to an operation performed by the splitter.

According to a fifth aspect of the present invention, there is provided a code-multiplexing communication apparatus for transmitting code-multiplexed data with use of a spread spectrum, comprising: a spread code generator generating a spread code for performing the spreading, for outputting phase displaced signals each split into number of N; a splitter converting incoming serial transmitting data into N number of signal sequences, for transmitting the signal sequences in parallel; N number of spreaders for performing the spreading for the N number of signal sequences with use of the spread code; an adder for adding outputs of the N number of spreaders; a filter for filtering an output signal of the adder with use of an inverse characteristic to a frequency characteristic of an autocorrelated distortion caused by the spreading; a transmitter having a modulator for modulating an output from the filter to output a transmitting signal; a de-spread code generator for generating a spread code for a de-spreading and outputting the spread code; a correlator performing a correlated calculation of an incoming received signal and the spread code to perform the de-spreading; an equalizer for removing a transmission path distortion from output signal of the correlator; and a receiver having a coupler for assembling receiving data by performing an inverse operation for an output signal from the equalizer to an operation performed by the splitter.

As aspects described above, the code-multiplexing communication apparatus has a filter on either the transmission side or reception side for previously removing the autocorrelated distortion caused by the spreading. According to such constitution, the affection of autocorrelated distortion does not emerge on the transmission characteristic when a communication performs under strict condition of subjecting to the autocorrelated distortion which affects the transmission characteristic and also when a numerous data transmission performs with increase of the number of code multiplex, enabling the numerous data and high quality transmission even under inferior condition of transmission path characteristic.

Furthermore, the autocorrelated distortion is previously removed prior to performing the correlated calculation for the de-spreading, increasing the number of code multiplex, sufficiently removing the transmission path distortion by the equalizer, and enabling high reliable data transmission.

The filter for removing the autocorrelated distortion can be incorporated in a desirable portion of the circuit in consideration of the number of code multiplex and the size of circuit as a whole, allowing the latitude of design.

BRIEF DESCRIPTION OF THE DRAWINGS

The above and other objects, advantages and features of the present invention will be more apparent from the following description taken in conjunction with the accompanying drawings in which:

FIGS. 7A and 7b are block diagrams showing a transmitting communication unit and a receiving communication unit for explaining a related art;

DESCRIPTION OF THE PREFERRED EMBODIMENTS

Figure 1A:
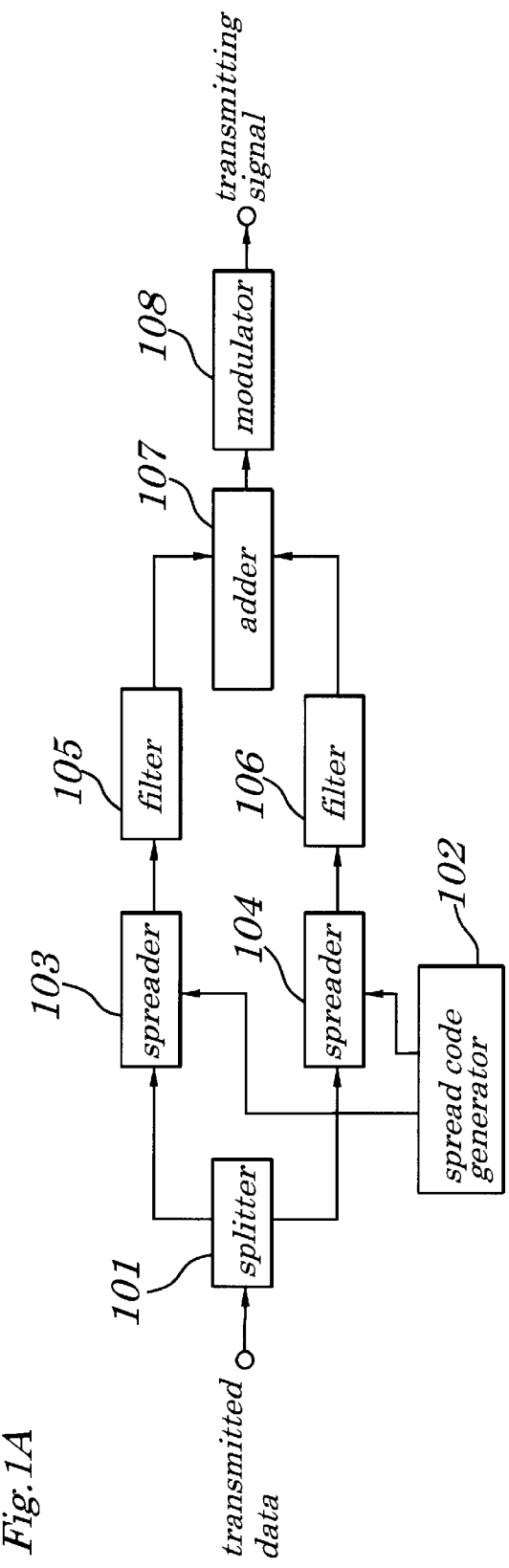
FIGS. 1A and 1B are block diagrams showing a transmitting communication unit and a receiving communication unit of a first embodiment in the present invention.
Figure 1B:
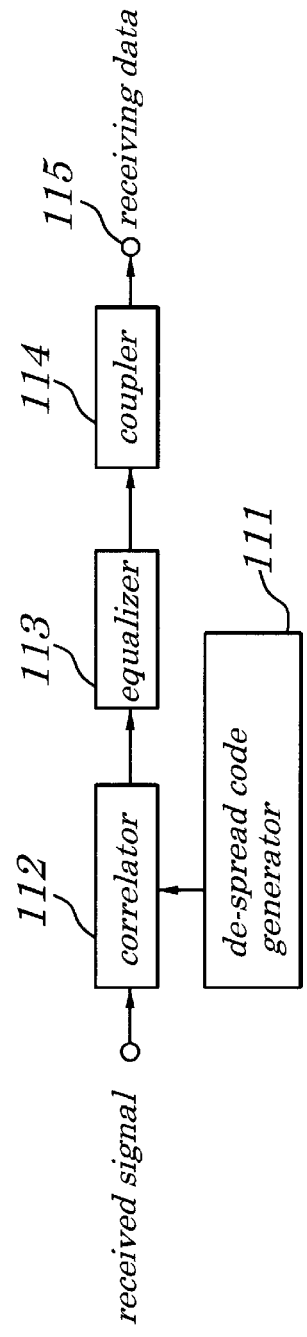

Hereinafter, embodiments of the present invention will be described with reference to the drawings. First, FIGS. 1A and 1B are block diagrams of a transmitting communication unit and a receiving communication unit of a first embodiment of a code-multiplexing communication apparatus. It is noted that N number of code multiplex is 2 in the following descriptions, but the descriptions in the case of N=3 is also applicable to the same.

Referring to FIG. 1A, the transmitting communication unit includes: a splitter 101 for splitting incoming transmitted data into two data signals; a spread code generator 102 for generating a spread code; spreaders 103, 104 for performing spreading for the two data signals split by the splitter 102; filters 105, 106 for filtering signals outputted from spreaders 103, 104; an adder 107 for adding output signals from the filters 105, 106; and a modulator 108 for modulating an output signal from the adder 107.

In addition, referring to FIG. 1B, the receiving communication unit includes: a de-spread code generator 111 for generating a spread code for a de-spreading; a correlator 112 for performing a correlated calculation of an incoming received signal and the spread code; an equalizer 113 for equalizing an output signal of the correlator 112; and a coupler 114 for reproducing receiving data from an output signal of the equalizer 113.

Figure 10A:
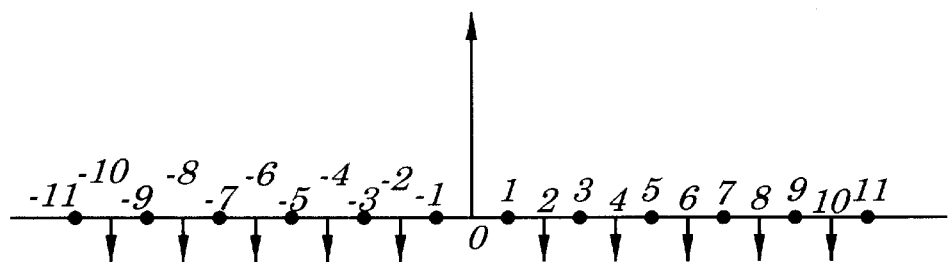
FIGS. 10A, 10B and 10C are explanatory diagrams for explaining autocorrelated distortion.
Figure 10B:
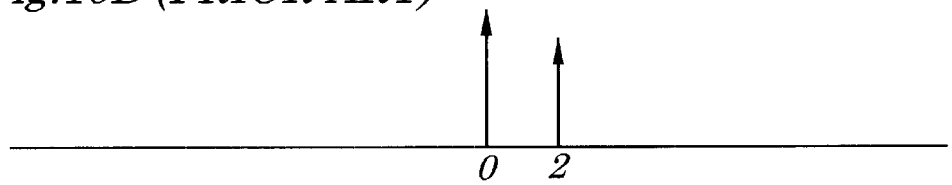

Each of the filters 105, 106 incorporated in the transmitting communication unit has a transfer characteristic which is an inverse characteristic to that of an autocorrelated distortion caused by the correlator 112 incorporated in the receiving communication unit. They have an impulse response shown in FIG. 2, for example. The impulse response shown in FIG. 2 indicates an inverse characteristic to a frequency characteristic of the autocorrelated value of the 11-bit Barker code shown in FIG. 10A which is described previously. That is, the impulse response shown in FIG. 2 and the response values shown in FIG. 10A are convoluted by a time zone, obtaining a delta function.

Figure 3:
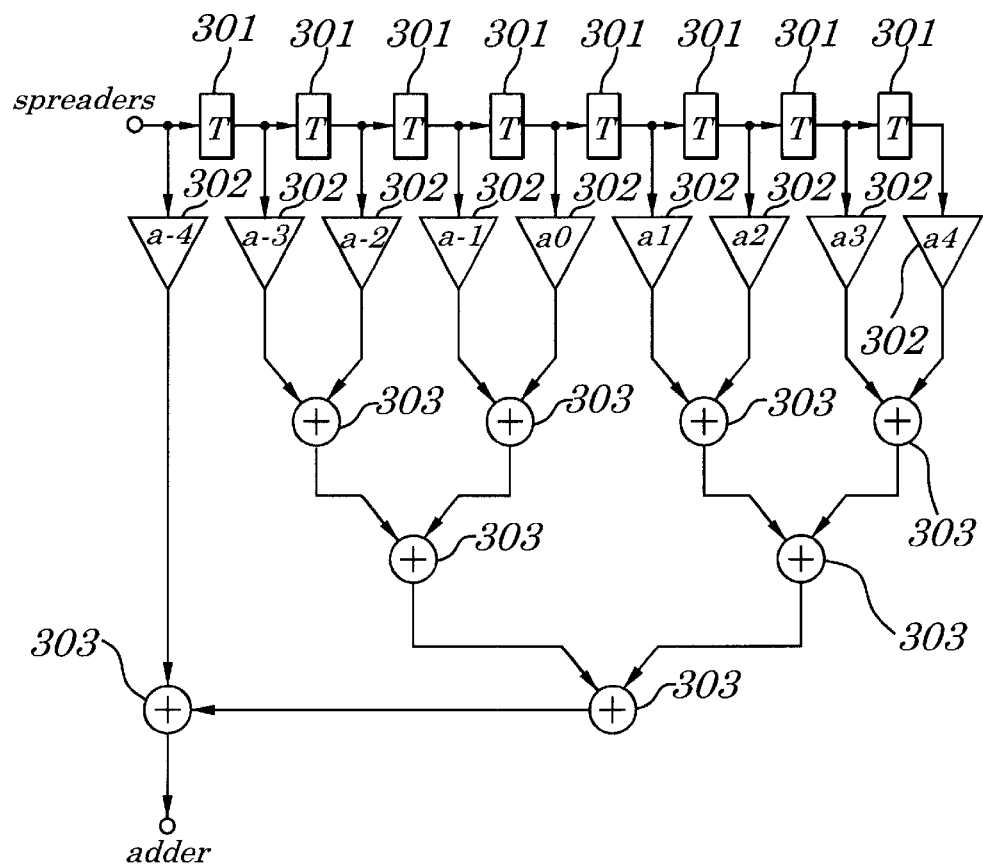
FIG. 3 is a circuit diagram showing specifically illustrated filters shown in FIG. 1A.

Such filters 105, 106 realize a transversal type filter shown in FIG. 3, for example. This type of filter is however constituted of eight-delay element 301, nine-multiplier 302, and eight-adder 303, which is a large scaled circuit. Therefore, such filter may also be constituted of the filters 105 and 106 shown in FIG. 4 for the purpose of constituting a small scaled circuit.

Figure 2:
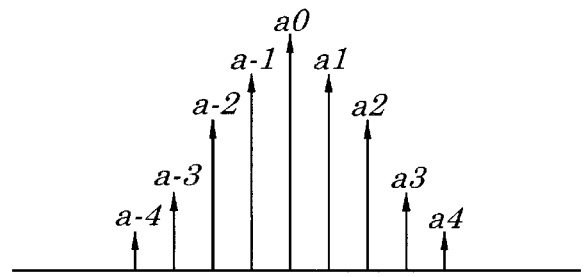
FIG. 2 is an explanatory diagram showing an impulse response of filters shown in FIG. 1A.
Figure 4:
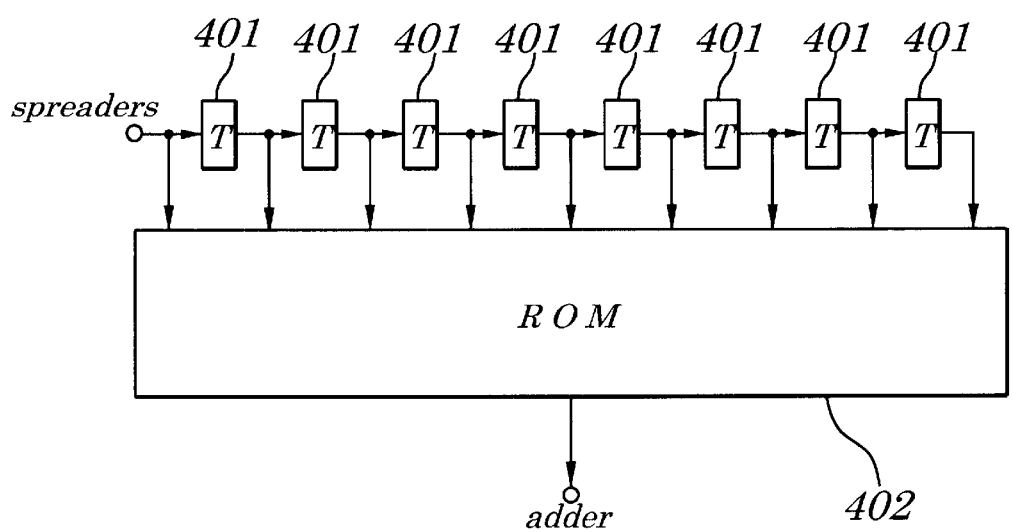
FIG. 4 is a circuit diagram showing other specifically illustrated filters shown in FIG. 1A.

The filter shown in FIG. 4 is constituted of a plurality of delay elements 401 and a read-only memory (ROM) 402, generating an address signal from output signals of the spreaders 103, 104 and obtaining output signals from the ROM 402 with use of the plurality of delay elements 401. This is because the filter uses outputs of binary signal having +1 and −1 outputted from the spreaders 103 and 104. Input signals from the spreaders 103 and 104 and convoluted signal values with the impulse response shown in FIG. 2 are previously written into the ROM 402, obtaining a signal similar to that of the transversal type filter shown in FIG. 3.

Operation of the code-multiplexing communication apparatus will be described below with reference to FIGS. 1A and 1B.

Referring to FIG. 1A showing the transmitting communication unit, incoming transmitted data enters first to the splitter 101 that splits the transmitted data into two data signals. At this time, the splitter 101 outputs the two data signals every 1-bit to the spreaders 103 and 104 alternately. Therefore, a symbol rate of the data signals inputted to the spreaders 103, 104 becomes a half of that of the transmitted data. That is, assuming that the transmission rate of transmitted data is 2 Mb/s, the bit rate of data signals for each of the spreaders 103 and 104 becomes 1 Mb/s.

The spread code generator 102 generates a pseudo random code as a spread code to be split into two signals, one of which is delayed and the other supplied to each of the spreaders 103, 104. The 11-bit Barker code is used as pseudo random number code, for example. The spread code generator 102 also displaces the phase of spread code by amount of two chips and outputs the pseudo random number code with a chip rate of 11 Mcps (chips per second).

The spreaders 103, 104 perform the spreading for the data signals split by the splitter 101 with use of the spread codes from the spread code generator 102. At this time, in the case where the data signal is inputted to each of the spreaders 103, 104 with 1 Mb/s of bit rate, and the spread signal is also inputted thereto with 11 Mcps of chip rate, the band of data signal is spread to 11 times.

The filters 105, 106 add a predistortion to the spread signals spread by the spreaders 103, 104 for the purpose of offsetting or removing an autocorrelated distortion caused by the correlator 112 shown in FIG. 1B.

The adder 107 adds or multiplexes the spread signals added the predistortion by the filters 105 and 106.

The modulator 108 modulates the signal added by the adder 107 so that it can be transmitted by radio transmission, and then outputs as a transmitting signal. Such transmitting signal is amplified by an amplifier (which is not shown in the drawing) and transmitted from an antenna.

Referring to FIG. 1B showing the receiving communication unit, the de-spread code generator 111 generates a spread code used for a de-spreading and supplies it to the correlator 112. The spread code generated from the de-spread code generator 111 is the same type of that generated from the spread code generator 102 incorporated in the transmitting communication unit. That is, that the spread code generator 102 generates the 11-bit Barker code with 11 Mcps of chip rate means that the de-spread code generator 111 also generates the 11-bit Barker code with 11 Mcps of chip rate.

Figure 8A:
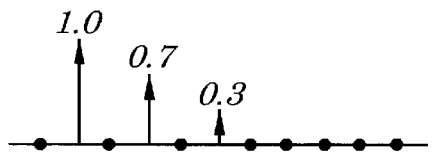
FIGS. 8A, 8B, 8C and 8D are explanatory diagrams for explaining an operation of an equalizer shown in FIG. 7B.
Figure 8B:
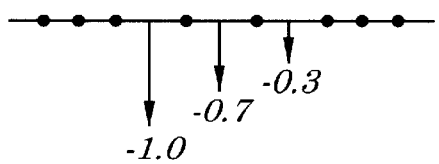
Figure 8C:
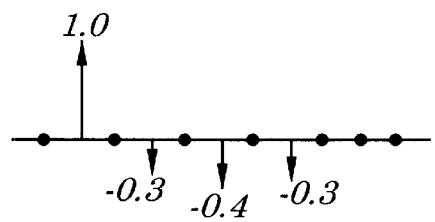
Figure 10C:
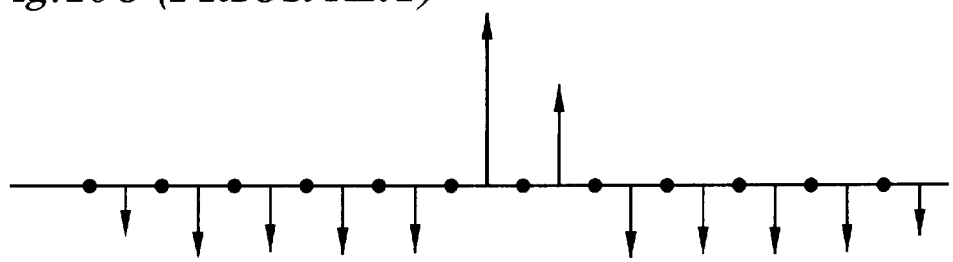

The incoming received signal amplified and demodulated is also inputted to the correlator 112 from an antenna (not shown in the drawing). The correlator 112 performs a correlated calculation of the received signal and the spread code from the de-spread code generator 111 to perform the de-spreading. In this case, the de-spreading is accompanied by autocorrelated distortion. However, the autocorrelated distortion such shown in FIG. 10C is not contained in an output signal from the correlator 112 since the distortion is previously added to the signal spread by the spreaders 103, 104 as described above, for offsetting such distortion. It is noted that the output from the correlator 112 remains the transmission path distortion contained shown in FIG. 8C.

Figure 9:
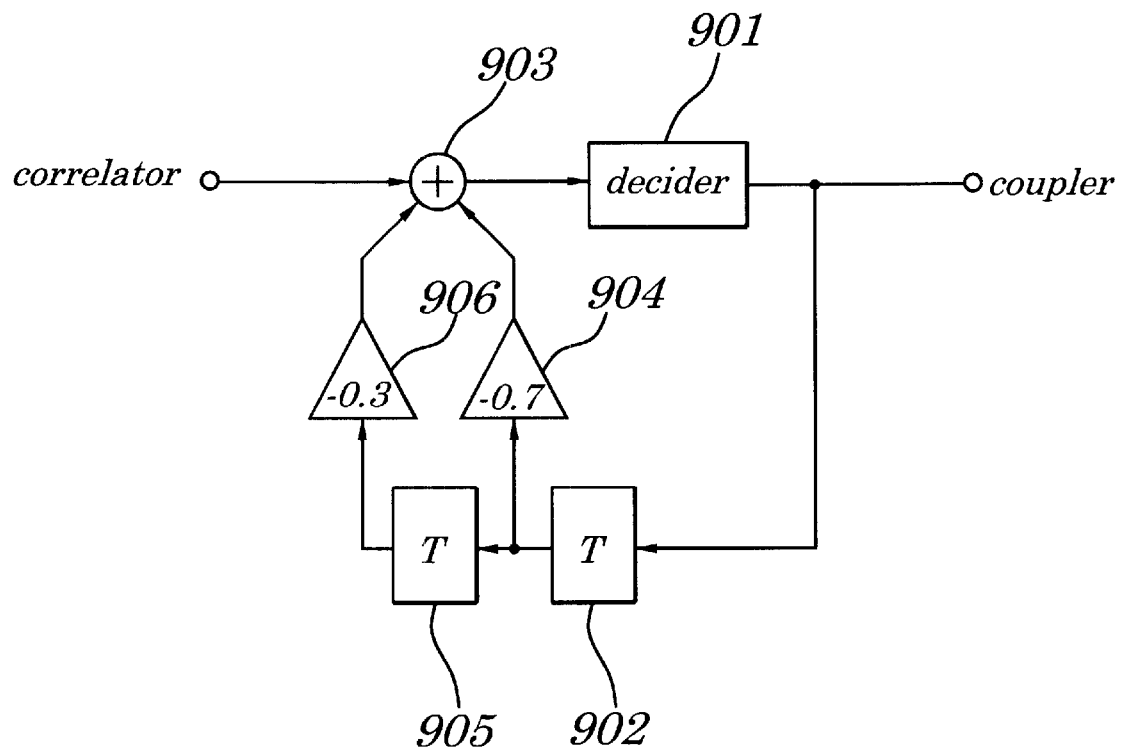
FIG. 9 is a circuit diagram showing a specifically illustrated equalizer shown in FIG. 7B.

In the case where the output from the correlator 112 remains the distortion contained, the signal decision cannot be performed correctly under such condition since the multiplexed signals interfere each other. The equalizer 113 therefore equalizes to remove the transmission path distortion contained in the output signal from the correlator 112. In this case, the equalizer 113 may be used of the decision feedback equalizer shown in FIG. 9.

Figure 8D:
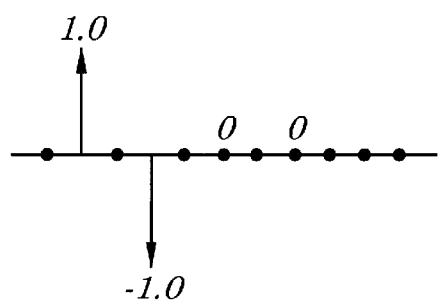

Output signal from the equalizer 113 is of a time-division multiplexing signal form corresponding to 11 Mb/s of bit rate as shown in FIG. 8D, therefore, the coupler 114 converts the output signal into a signal form of 2 Mb/s similar to the incoming transmitted data. Accordingly, the autocorrelated distortion is removed from the output signal of the correlator 112.

Figure 5A:
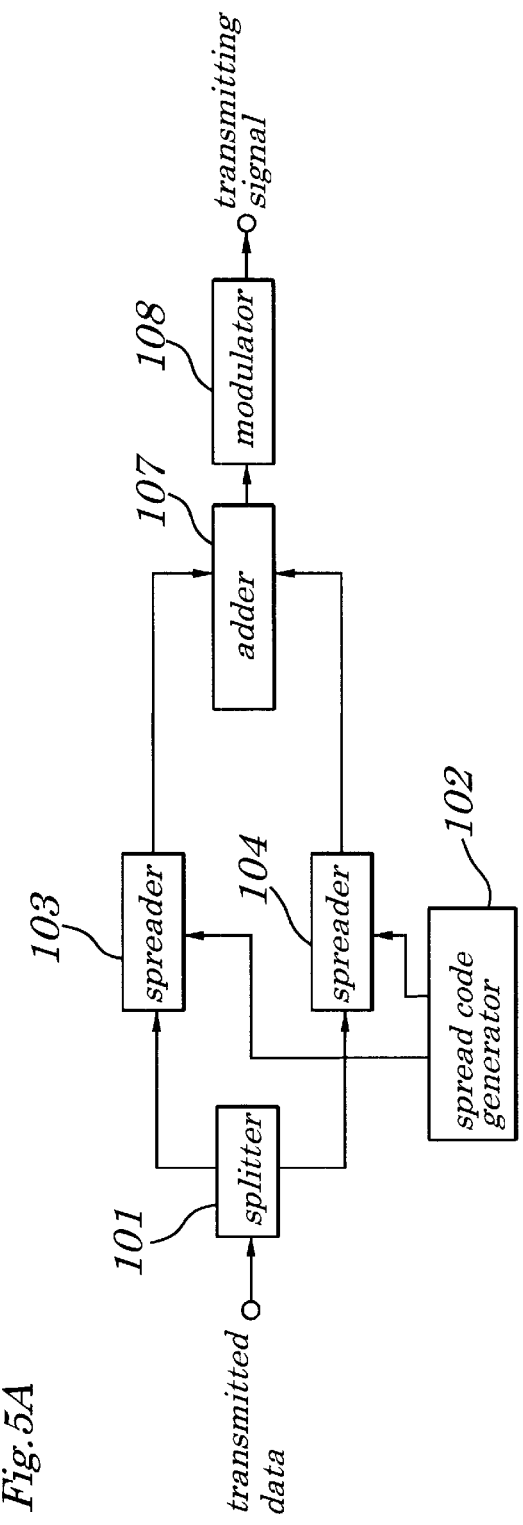
FIGS. 5A and 5B are block diagrams showing a transmitting communication unit and a receiving communication unit of a second embodiment in the present invention.

A second embodiment of the code-multiplexing communication apparatus in the present invention will be described with reference to FIGS. 5A and 5B.

Figure 5B:
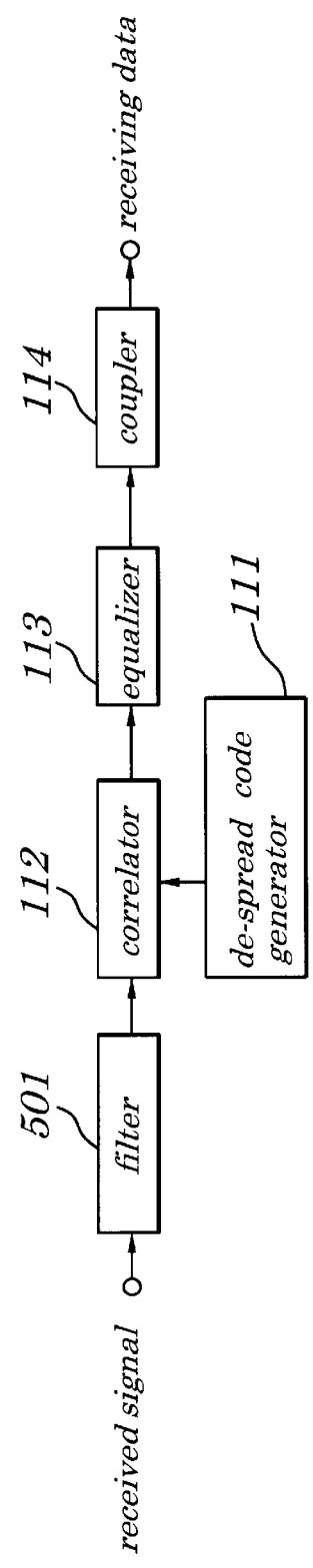

Referring to FIG. 5B showing the communication apparatus, a filter for removing the autocorrelated distortion is incorporated in the receiving communication unit, which is different from the first embodiment shown in FIG. 1A. That is, a filter 501 is incorporated in the preceding stage of correlator 112 in the receiving communication unit. The filter 501 of course has a transfer function of inverse characteristic to that of a autocorrelated distortion caused by the correlator 112.

In the case where the filter is incorporated in the transmitting communication unit as described in the first embodiment, the amplitude of transmitting signal becomes large. Because of this, the dynamic range of transmitting amplifier (not shown in the drawing) should be made wide, but its non-linear distortion must be reduced in the first embodiment. The second embodiment however does not require such measures, decreasing a burden for the transmitting amplifier. While an incoming received signal inputted to the filter 501 becomes a multi-valued signal besides binary signal, therefore, the filter 501 must be of such transversal type filter shown in FIG. 3. FIGS. 5A and 5B include elements similar to those shown in FIGS. 1A and 1B which have been already described above, the same reference numerals in FIGS. 1A and 1B are used in FIGS. 5A and 5B for the same elements, therefore detailed descriptions for these are omitted.

A third embodiment of the code-multiplexing communication apparatus in the present invention will be described with reference to FIG. 6.

Figure 6:
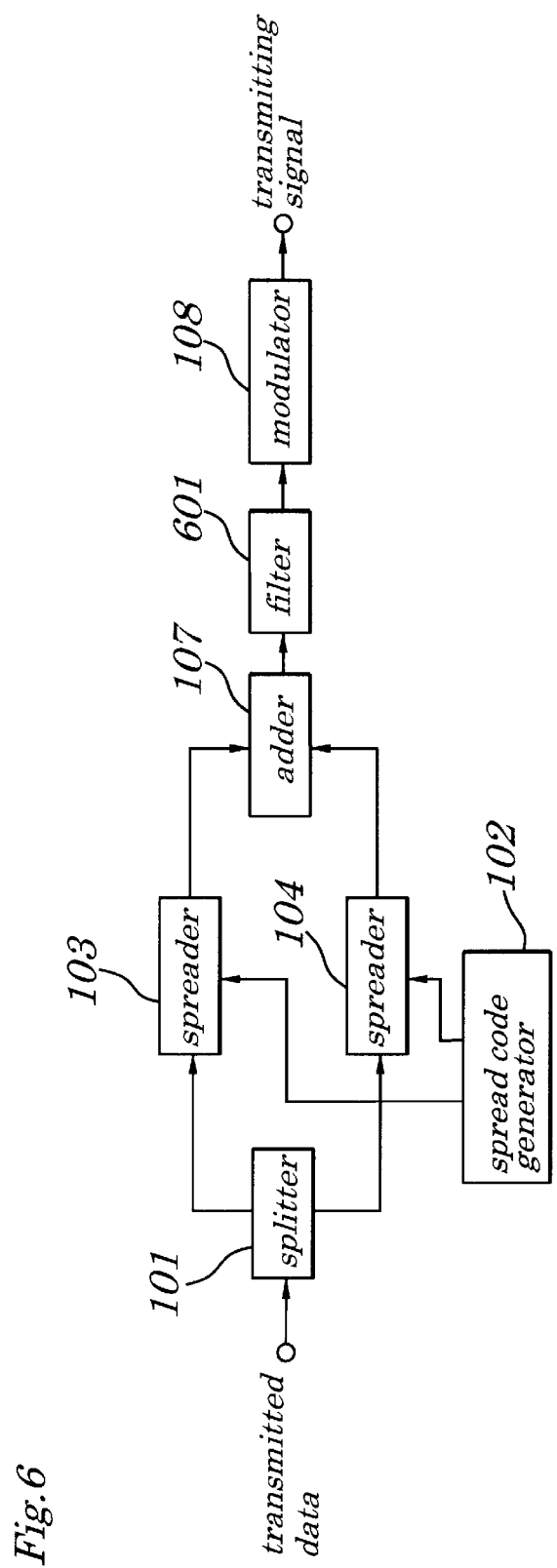
FIG. 6 is a block diagram showing a transmitting communication unit of a third embodiment in the present invention.

Referring to FIG. 6, a filter 601 for removing the autocorrelated distortion is incorporated in between a adder 107 and a modulator 108 in the transmitting communication unit. The filter 601 of course a transfer function of an inverse characteristic to a characteristic of the autocorrelated distortion caused by a correlator 112. FIG. 6 includes elements similar to those shown in FIGS. 1A and 1B which have been already described above, the same reference numerals in FIGS. 1A and 1B are used in FIG. 6 for the same elements, therefore detailed descriptions for these are omitted.

Accordingly, in the case of the first embodiment, the number of filters should increase while the number of code multiplex is attempted to increase. In contrast, a single filter is enough regardless of the number of code multiplex in the third embodiment. However, the number of addresses increases in geometrical progression with increase of the number of code multiplex in the case of applying a manner of using the ROM as shown in FIG. 4, it is thereby difficult to achieve such circuitry having filter. It would rather be easy to achieve a transversal type filter shown in FIG. 3. Consequently, the structure of filter in the third embodiment must be considered as to which type of filter should be used.

It is thus apparent that the present invention is not limited to the above embodiments but may be changed and modified without departing from the scope and spirit of the invention.

Finally, the present invention application claims the priority of Japanese Patent Application No. Hei09-168348 filed Jun. 25, 1997, which is herein incorporated by reference.

What is claimed is:

1. A code-multiplexing communication apparatus including:
   a splitting means for splitting incoming serial transmitted data into N (N is integer equal to or greater than 2) number of signal sequences;
   N number of spread means for performing spreading for each of the N number of signal sequences with use of a spread code;
   an adder means adding the N number of signal sequences with the spreading processed by the N number of spread means, for outputting a code-multiplexing signal; and
   a modulating means for modulating the code-multiplexed signal, comprising:
      a filter having an inverse characteristic to a frequency characteristic of an autocorrelated distortion caused by the spreading
      wherein the filter is provided on a succeeding stage of the adding means,
      wherein the filter includes a transversal filter having a plurality of delay elements, a plurality of multipliers, and a plurality of adders.

2. An apparatus according to claim 1 wherein the transversal filter includes the plurality of delay elements connected in series with input and output of the elements connected, the connections between the delay elements including the input and output of both ends of the elements are connected to inputs of the plural multipliers respectively, and outputs of the multipliers are connected to the plural adders such that two outputs of the multipliers are connected to one of said plural adders as two inputs.

3. An apparatus according to claim 2 wherein one output of the adders is connected to an input of one adder, another input of which is connected from another output of the adders, and an output of a last stage of adder is connected to an input of an adder, another input of which is connected to the output of multiplier located at an input terminal of the filter, obtaining an output signal from the output of the last stage of adder.

4. A code-multiplexing communication apparatus including:
- a splitting means for splitting incoming serial transmitted data into N (N is integer equal to or greater than 2) number of signal sequences;
- N number of spread means for performing spreading for each of the N number of signal sequences with use of a spread code;
- an adder means adding the N number of signal sequences with the spreading processed by the N number of spread means, for outputting a code-multiplexing signal; and
- a modulating means for modulating the code-multiplexed signal, comprising:
  - a filter having an inverse characteristic to a frequency characteristic of an autocorrelated distortion caused by the spreading
  - wherein the filter is provided on a succeeding stage of the adding means,
  - wherein the filter includes a plurality of delay elements and a read-only memory.

5. An apparatus according to claim 4 wherein the filter includes the plurality of delay elements connected in series with input and output of the elements connected, and the connections between the delay elements including the input and output of both ends of the delay elements are connected to inputs of the read-only memory, respectively.

6. A code-multiplexing communication apparatus including that incoming serial transmitted data is split into N number of signal sequences, a spread spectrum is performed for each of the signal sequences with use of a spread code, the N number of signal sequences with the spreading processed are added to each other, a code-multiplexed signal modulated and transmitted is received, and correlation means carries out a de-spreading for a received signal, wherein a filter provided on a preceding stage of the correlation means, the filter having an inverse characteristic to a frequency characteristic of an autocorrelated distortion caused by the spreading, wherein the filter includes a transversal filter having a plurality of delay elements, a plurality of multipliers and a plurality of adders.

7. An apparatus according to claim 6 wherein the transversal filter includes that the plurality of delay elements are connected in series with input and output of the elements connected, the connections between the delay elements including the input and output of both ends of the elements are connected to inputs of the plural multipliers respectively, and outputs of the multipliers are connected to the plural adders such that two outputs of the multipliers are connected to one of said plural adders as two inputs.

8. An apparatus according to claim 7 wherein one output of the adders is connected to an input of one adder, another input of which is connected from another output of the adders, and an output of a last stage of adder is connected to an input of an adder, another input of which is connected to the output of multiplier located at an input terminal of the filter, obtaining an output signal from the output of the last stage of adder.

9. A code-multiplexing communication apparatus including that incoming serial transmitted data is split into N number of signal sequences, a spread spectrum is performed for each of the signal sequences with use of a spread code, the N number of signal sequences with the spreading processed are added to each other, a code-multiplexed signal modulated and transmitted is received, and correlation means carries out a de-spreading for a received signal, wherein a filter provided on a preceding stage of the correlation means, the filter having an inverse characteristic to a frequency characteristic of an autocorrelated distortion caused by the spreading, wherein the filter comprises a plurality of delay elements and a read-only memory.

10. An apparatus according to claim 9 wherein the filter includes the plurality of delay elements connected in series with input and output of the elements connected, and the connections between the delay elements including the input and output of both ends of the delay elements are connected to inputs of the read-only memory, respectively.

* * * * *